United States Patent [19]

Nakanishi et al.

[11] 4,259,690
[45] Mar. 31, 1981

[54] MULTI-PICTURE TUNING SCHEME OF TELEVISION RECEIVER

[75] Inventors: Kaoru Nakanishi, Izumisano; Masahiro Kanchi, Osaka, both of Japan

[73] Assignee: Sharp Kabushiki Kaisha, Osaka, Japan

[21] Appl. No.: 948,632

[22] Filed: Oct. 3, 1978

[30] Foreign Application Priority Data

Oct. 6, 1977 [JP] Japan ............................... 52-120726
Oct. 6, 1977 [JP] Japan ............................... 52-120727

[51] Int. Cl.³ ............................................. H04N 5/48
[52] U.S. Cl. .................................... 358/183; 358/191.1
[58] Field of Search ............... 358/182, 183, 188, 191, 358/192; 325/465, 396; 334/1, 15, 14; 455/184–187

[56] References Cited

U.S. PATENT DOCUMENTS

| | | | |
|---|---|---|---|
| 4,070,695 | 1/1978 | Scholz | 358/183 |
| 4,139,860 | 2/1979 | Micic et al. | 358/183 |
| 4,167,704 | 9/1979 | Sato et al. | 358/191 |

FOREIGN PATENT DOCUMENTS 2540965  3/1977  Fed. Rep. of Germany .......... 358/183

OTHER PUBLICATIONS

Cota, Die Technik des. "Bild im Bild"-Systems, *Funkschan*, 1977, Heft 16, pp. 719–721.

*Primary Examiner*—John C. Martin
*Attorney, Agent, or Firm*—Birch, Stewart, Kolasch and Birch

[57] ABSTRACT

A multi-picture tuning scheme suitable for a television receiver of the type which displays at least two kinds of television pictures simultaneously on a same screen tube employed therein includes a series of channel selection switches, a control switch, a storage device responsive to the series of channel selection switches to store two series of channel selection information according to the series of channel selection switches, a selection circuit responsive to the control switch to select the storage of the channel selection information into the storage device so that one of the two series of channel selection information is allocated in the storage device, and a tuning device responsive to the storage device for receiving a channel in accordance with the channel selection information.

10 Claims, 4 Drawing Figures

MULTI-PICTURE TUNING SCHEME OF TELEVISION RECEIVER

BACKGROUND OF THE INVENTION

The present invention relates to a multi-picture tuning scheme of a television receiver and, more particularly, to a tuning scheme of a television receiver which provides a visual display of at least two channel pictures (that is, a main- and a sub-picture) on a same picture tube.

Television receivers with faculties of displaying at least two kinds of channel pictures simultaneously on a same screen tube are well-known. However, the well know type of a television receiver lacked exchangeability between the main-picture and the sub-picture and required two discrete channel selection assemblies.

OBJECTS AND SUMMARY OF THE INVENTION

Accordingly, it is the primary object of the present invention to provide an improved multi-picture tuning scheme suitable for a television receiver of the type which displays at least two kinds of television pictures simultaneously on a same screen tube employed therein.

It is another object of the present invention to provide an improved multi-picture tuning scheme including only one channel selection switch assembly useful for such a television receiver previously mentioned.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a first and second memories are provided for storing channel selection information derived from a channel selection device of the present invention including only one channel selection switch assembly. A control switch is energized for controlling the storage of the channel selection information according to the channel selection switch assembly into either the first or second memories. A first and second transfer devices are coupled respectively to the first and second memories. Each of the two transfer devices functions to provide the channel selection information stored in the first or second memories into respective first or second tuners. The channel selection information applied to the first and second tuners is simultaneously and individually enabled in two channel pictures included within a same cathode ray tube employed in a television receiver.

Exchange elements can be interconnected between both the first and second memories and the first and second transfer devices for causing exchange of the channel selection information derived from the first and second memories.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
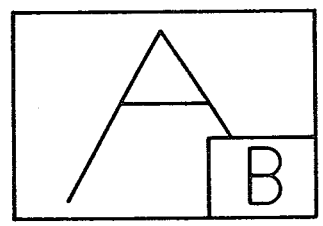
FIG. 1 is a plane view of a screen of a cathode ray tube of a television receiver adopted to the present invention.

FIG. 1 illustrates a screen of a cathode ray tube of a television receiver adopted to the present invention wherein two pictures are simultaneously displayed in individual television pictures A and B, respectively.

Figure 2:
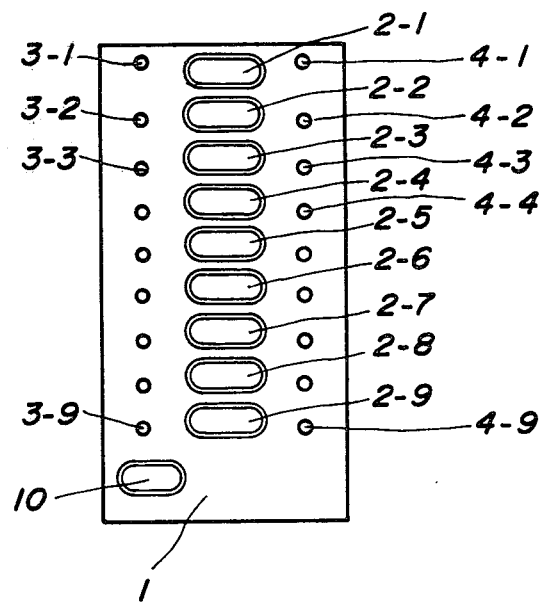
FIG. 2 is a plane view of a control panel adopted to a channel selection device of the present invention.

FIG. 2 depicts a control panel 1 adopted to a channel selection device of the present invention. The control panel 1 comprises a series of channel selection switches 2-1 to 2-9, two series of indication lamps 3-1 to 3-9 and 4-1 to 4-9, and a control switch 10. For example, a first series of indication lamps 3-1 to 3-9 are enabled to indicate relevant channels when a main channel selection is carried out in the channel selection device. A second series of indication lamps 4-1 to 4-9 are, on the other hand, enabled to identify the relevant channels when a sub channel selection is taken place in the channel selection device. The control switch 10 is provided for controlling enabling of the main channel selection or the sub channel selection.

Figure 3:
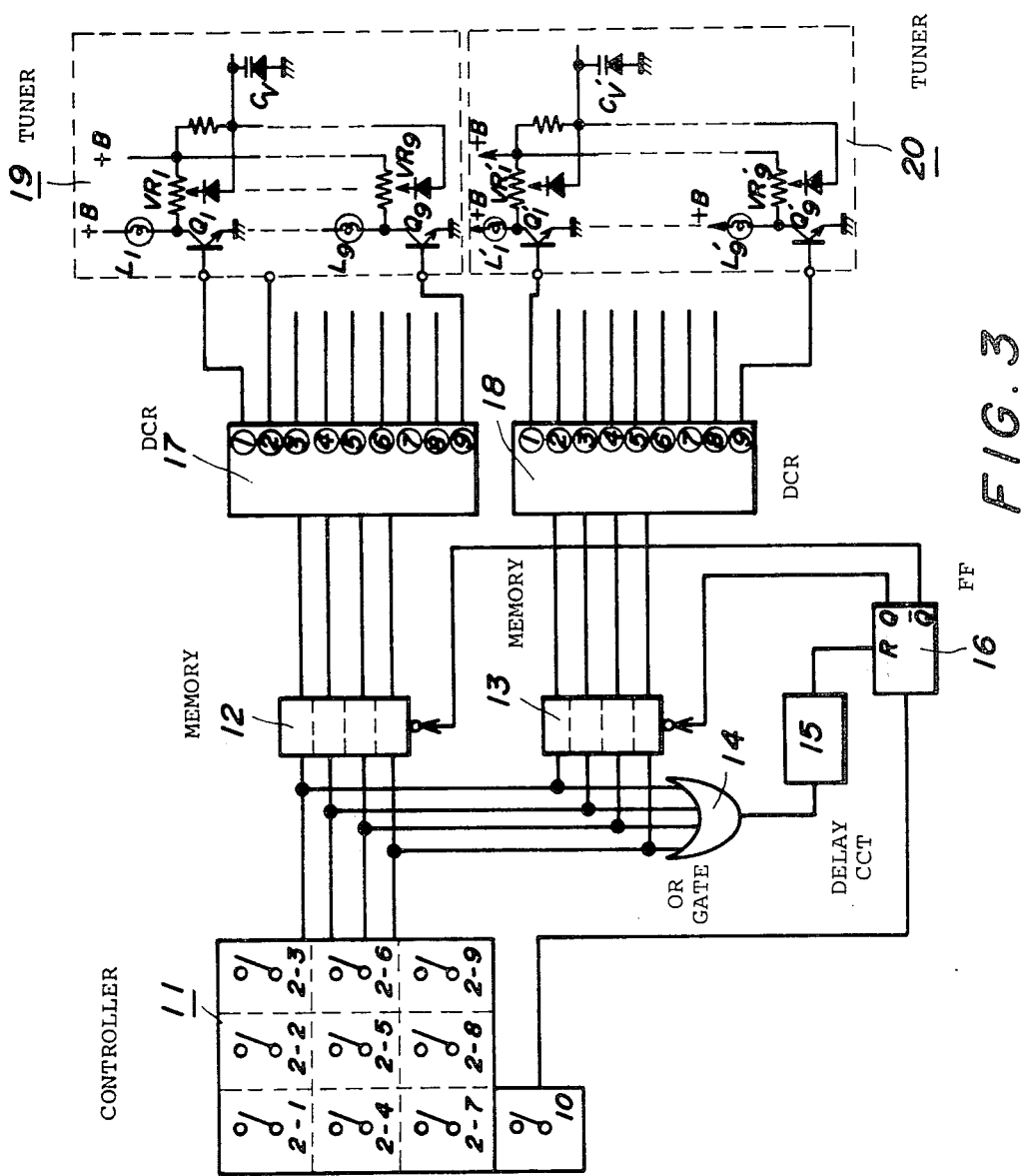
FIGS. 3 and 4 are block diagrams of control circuits of the channel selection devices of the present invention.

FIG. 3 shows a circuit configuration of the channel selection device of the present invention. The circuit configuration comprises the series of channel selection switches 2-1 to 2-9 and the control switch 10 both included within a controller 11 related to the control panel 1 of FIG. 2. A main channel selection memory depicted by a numeral 12 is provided for storing channel selection information according to the main channel selection and has memory storage of 4 bits. A sub channel selection memory denoted as 13 is also provided for storing the channel selection information according to the sub channel selection and has memory storage of 4 bits as well.

The circuit configuration further includes an OR gate 14, a delay circuit 15, a flip-flop 16, decoders 17 and 18, and tuners 19 and 20. The tuner 19 is connected to the main channel selection memory 12 through the decoder 17. Similarly, the tuner 20 is coupled to the sub channel selection memory 13 through the decoder 18. The tuners 19 and 20 are operated for displaying the pictures A and B shown in FIG. 1, respectively.

A plurality of preset potentiometers $VR_1$ to $VR_9$ are provided within the tuner 19 for receiving relevant channels in accordance with the plurality of channel selection switches 2-1 to 2-9 and causing preseting of tuning voltages for the channels. A plurality of preset potentiometers $VR_1$ to $VR'_9$ are also wired for the same purposes in the tuner 20. A plurality of illumination lamps $L_1$ to $L_9$ and $L_1'$ to $L_9'$ are related to the two series of indication lamps 3-1 to 3-9 and 4-1 to 4-9 shown in FIG. 2, respectively.

It is now assumed that one of the channel selection switches 2-1 to 2-9 is actuated for selecting a desirable channel. The channel selection information relevant to one of the channel selection switches 2-1 to 2-9 is supplied simultaneously into the main and sub channel selection memories 12 and 13 in coded format. The channel selection switch 2-1 provides, for example, the channel selection information of "0001" in response to the activation thereof. The channel selection switch 2-2 generates the channel selection information of "0010" in response to the activation thereof. Similarly, the channel selection switch 2-9 develops the channel selection information of 37 1001" in accordance with the energization thereof.

The flip-flop 16 is allowed to remain on a reset condition thereof and provide low level signals from an output terminal Q and, simultaneously, high level signals from an output terminal $\overline{Q}$. It is wired, under these circumstance, so that the main channel selection memory 12 can store the resulting channel selection information while the sub channel selection memory 14 can not store the resulting channel selection information to thereby retain the previous channel selection information in the memory storage.

Under these circumstances, the resulting channel selection information stored in the main channel memory 12 is converted by the decoder 17 to cause one output among the outputs ①  to ⑨ of the decoder 17 to be brought to the high level signals. The selected output corresponds to the actuated channel selection switch. A relevant switching transistor selected from a group of switching transistors $Q_1$ to $Q_9$ in the tuner 19 is turned on. A relevant preset potentiometer among the preset potentiometers $VR_1$ to $VR_9$ provides a preset tuning voltage to a channel tuning diode $C_v$ so that a selected channel is allowed to be received in the tuner 19.

When the control switch 10 is not activated but the channel selection switches 2-1 to 2-9 are in turn activated, the channel selection information corresponding to the channel selection switches 2-1 to 2-9 is continuously applied to and stored in the main channel selection memory 12. The selected channel is allowed to be received in the tuner 19 in accordance with the channel selection information stored in the main channel selection memory 12. The sub channel selection memory 13 is, on the other hand, allowed to remain storing the previous channel selection information. The tuner 20 consistently receives the channel relevant to the previous channel selection information.

The channel received in the tuner 20 is exchanged in accordance with the following manner. The control switch 10 is first activated and, subsequently, one of the channel selection switches 2-1 to 2-9 is energized for selection purposes. The flip-flop 16 is reversed in response to the control switch 10, to permit the output signals developed from the output terminal Q to be brought to the high level signals and simultaneously, allow the output signals generated from the output terminal $\overline{Q}$ to be brought to the low level signals.

Therefore, the sub channel selection memory 13 can receive and store the channel selection information according to one of the channel selection switches 2-1 to 2-9. The main channel selection memory 12, on the other hand, is allowed to keep the previous channel selection information. The resulting channel selection information stored in the sub channel selection memory 13 is utilized for receiving the selected channel in the tuner 20 in the same manner as described above.

It is required to conduct exchange operations in the tuner 20 that the control switch 10 is activated in each case for exchanging operations. This is because the OR gate 14 is conductive in response to the actuation of one of the channel selection switches 2-1 to 2-9 and the flip-flop 16 is allowed to reset in each case. Output signals developed from the OR gate 14 are applied to a reset terminal of the flip-flop 16 after they are transferred by the delay circuit 15 and delayed at a predetermined time.

Therefore, if only the channel selection switches 2-1 to 2-9 are activated without any energization of the control switch 10, the resulting channel selection information is allowed to be stored in the main channel selection memory 12 to thereby enable tuning operations in the tuner 19.

Figure 4:
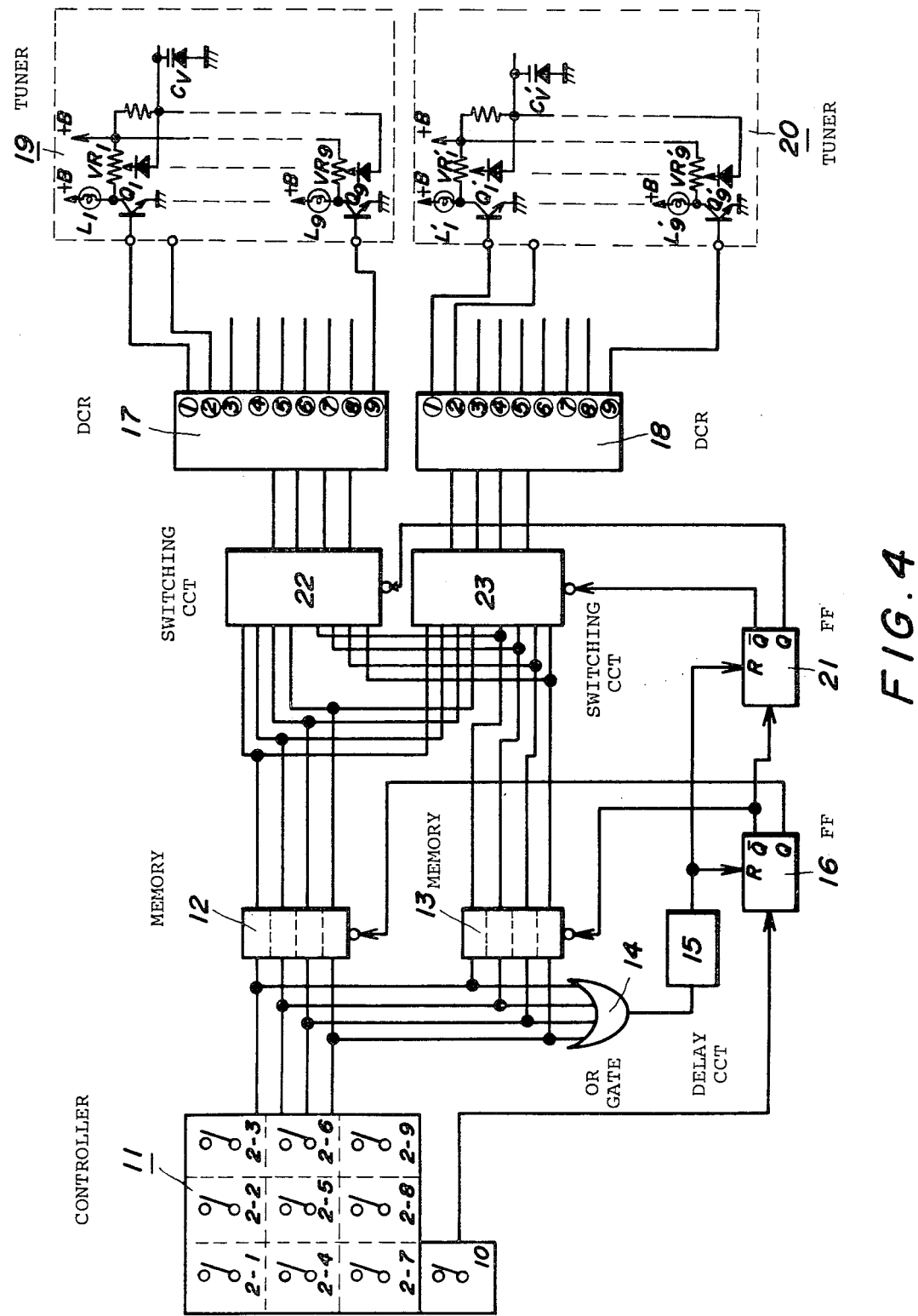

FIG. 4 depicts another circuit configuration of the channel selection device of the present invention. The circuit configuration shown in FIG. 4 is identical to that of FIG. 3 with the exception that a flip-flop 21 and two switching circuits 22 and 23 are further included in addition to the circuit configuration of FIG. 3. The two switching circuits 22 and 23 are provided for exchanging the selected channel selection information applied to the tuners 19 and 20 each other. The channel selection information stored in the main and sub channel selection memories 12 and 13 are respectively applied to the tuners 19 and 20 through the switching circuits 22 and 23 and the decoder 17 and 18.

When the control switch 10 is not actuated but the channel selection switches 2-1 to 2-9 are in turn energized, the two flip-flops 16 and 21 are both reset to provide the low level signals from the outputs Q of the two flip-flops 16 and 21 and, simultaneously, develop the high level signals from the outputs $\overline{Q}$ of the same.

Under these circumstances, only the main channel selection memory 12 can receive and store the channel selection information derived from one of the channel selection switches 2-1 to 2-9 as previously described with reference to FIG. 3. However, the sub channel selection memory 13 can not receive and store the resulting channel selection information but remains storing the previous channel selection information as mentioned above.

The channel selection information applied to the tuners 19 and 20 are exchanged each other in accordance with the following manner by the switching circuits 22 and 23. The control switch 10 is actuated twice in succession to thereby reverse the flip-flop 16 twice in succession. Therefore, the flip-flop 21 is once reversed to provide the high level signals from the output Q and, simultaneously, the low level signals from the output $\overline{Q}$. The channel selection information stored in the main channel selection memory 12 is allowed to be transferred into the decoder 18 through the switching circuit 23. The channel selection information stored in the sub channel selection memory 13 is, similarly, allowed to be transferred into the decoder 17 through the switching circuit 22. Therefore, the channel selection information applied to the tuners 19 and 20 is exchanged each other, whereby the pictures A and B of FIG. 1 are interchanged each other.

When the control switch 10 is further energized twice in succession, under these circumstances, the flip-flop 21 returns back again so that the tuners 19 and 20 are allowed to have the previous channel selection information before exchange operations.

When the channel selection switches 2-1 to 2-9 are in turn actuated, the resulting channel selection information is applied to and stored in the main channel selection memory 12. The OR gate 14 becomes conductive to provide gate output signals impressed into the reset termal of the flip-flop 21 through the delay circuit 15.

Since the flip-flop 21 is turned reset, the resulting channel selection information according to the channel selection switches 2-1 to 2-9 is applied the tuner 19.

The channel selection information applied to the tuner 20 can be modified in accordance with the same manner as mentioned above with respect to FIG. 3. The control switch 10 is once actuated and then one of the relevant channel selection switches 2-1 to 2-9 is activated. The flip-flop 16 is once reversed to generate the high level signals from the output terminal Q and, simultaneously, the low level signals from the output terminal $\overline{Q}$. Thereafter, if one of the channel selection switches 2-1 to 2-9 is actuated, without further actuation of the control switch 10, the resulting channel selection information is applied to and stored in the main channel selection memory 12 as described previously.

While only certain embodiments of the present invention have been described, it will be apparent to those skilled in the art that various changes and modifications may be made therein without departing from the spirit and scope of the invention as claimed.

What is claimed is:

1. A channel selection device for use in a television receiver of the type which provides at least two kinds of television pictures simultaneously on the same screen tube employed therein, the channel selection device comprising:
   a channel selection switch assembly for generating channel selection information;
   a control switch;
   first and second storage means responsive to the channel selection switch assembly, each of said storage means storing channel selection information derived from said channel selection switch assembly;
   selection means responsive to said control switch for controlling the application of said channel selection information to one of said first and second storage means; and
   first and second tuning means responsive to the first and second storage means respectively for receiving a channel in accordance with the channel selection information.

2. The channel selection device according to claim 1, which further comprises switching means for selectively interchanging the channel selection information from said first storage means to said second tuning means and from said second storage means to said first tuning means.

3. The channel selection device according to claim 2, which further comprises a second control switch for controlling said switching means.

4. The channel selection device according to claims 1 or 2, wherein said selection means comprises a flip-flop.

5. The channel selection device according to claims 1 or 2, which further comprises:
   an OR gate responsive to said channel selection switch assembly;
   enabling means responsive to said OR gate for allowing said selection means to be brought to a condition where said selection means enables said second storage means to store the channel selection information when said channel selection switch is depressed following the actuation of said control switch.

6. The channel selection device of claims 1 or 2 wherein said first and second tuning means each include a plurality of preset channel tuning voltage generators.

7. The channel selection device according to claim 6, wherein each of said preset channel tuners includes an indication lamp, said indication lamp being energized when its respective preset channel tuner is energized.

8. A channel selection device for use in a television receiver of the type which provides at least two kinds of television pictures from two different television signals simultaneously displayed on the same screen tube employed therein, comprising:
   a channel selection switch assembly for generating channel selection information;
   first and second tuning means responsive to said channel selection information, each of said tuning means for receiving a selected television signal; and
   switching means for selectively interchanging the channel selection information from said channel selector switch assembly to either of said first or second tuning means.

9. The channel selection device of claim 8 further comprising:
   first and second storage means responsive to said channel selection information for retaining said channel selection information and constantly supplying said information to said tuning means;
   said switching means selectively interchanging the channel selection information presented to said storage means.

10. A channel selection device for use in a receiver capable of tuning in at least two different frequencies simultaneously, comprising:
    a single channel selection switch assembly for supplying all of the channel selection frequency information in said device;
    first and second memory means for storing said channel selection frequency information;
    first and second tuners responsive to said first and second memory means respectively; and
    means responsive to said channel selection switch assembly for loading said channel selection frequency information into said first and second memories.

* * * * *